United States Patent
Dar et al.

(10) Patent No.: US 12,536,080 B2
(45) Date of Patent: Jan. 27, 2026

(54) SYSTEM AND METHOD FOR MACHINE LEARNING-DRIVEN PHYSICAL STORAGE DEVICE FAILURE DETECTION, CLASSIFICATION, AND RESOLUTION

(71) Applicant: Dell Products L.P., Round Rock, TX (US)

(72) Inventors: Shaul Dar, Petach Tikva (IL); Arun Rameshbabu, Newfoundland (CA)

(73) Assignee: Dell Products L.P., Round Rock, TX (US)

( * ) Notice: Subject to any disclaimer, the term of this patent is extended or adjusted under 35 U.S.C. 154(b) by 44 days.

(21) Appl. No.: 18/422,380

(22) Filed: Jan. 25, 2024

(65) Prior Publication Data
US 2025/0245109 A1      Jul. 31, 2025

(51) Int. Cl.
*G06F 11/22* (2006.01)

(52) U.S. Cl.
CPC ................. *G06F 11/2257* (2013.01)

(58) Field of Classification Search
CPC .................................................. G06F 11/2257
USPC ............................................................. 714/47.3
See application file for complete search history.

(56) References Cited

U.S. PATENT DOCUMENTS 9,244,790 B1 *   1/2016   Ma ..................... G06F 11/008
2020/0104200 A1 *   4/2020   Kocberber ............. G06N 3/082

* cited by examiner

*Primary Examiner* — Yair Leibovich
(74) *Attorney, Agent, or Firm* — Brian J. Colandreo; Heath M. Sargeant; Holland & Knight LLP

(57) ABSTRACT

A method, computer program product, and computing system for generating a respective diagnostic history associated with each physical storage device of a plurality of physical storage devices. A subset of diagnostic history associated with a class of failing physical storage devices is identified from the diagnostic history associated with each physical storage device. The subset of diagnostic history associated with the class of failing physical storage devices is enhanced. A physical storage device failure event for a target physical storage device is forecast using a machine learning model and the enhanced subset of diagnostic history associated with the class of failing physical storage devices.

17 Claims, 7 Drawing Sheets

SYSTEM AND METHOD FOR MACHINE LEARNING-DRIVEN PHYSICAL STORAGE DEVICE FAILURE DETECTION, CLASSIFICATION, AND RESOLUTION

BACKGROUND

Storage devices, such as disks, are the primary components of storage subsystems. Recent studies indicate that disk failures are the biggest factor in storage failures, contributing 20-55% of storage subsystem failures. Vendor studies estimate that for most storage devices, the specified mean-time-to-failure (MTTF) is typically around one million hours, equivalent to about 1% annualized failure rate (AFR). The failure rates observed in user studies are even higher [0.9-1.9%].

The direct annual cost of disk replacements for storage and server systems is This includes the cost of onsite technician visits, express shipping of new parts, and collateral damage that may occur such as data unavailability or even data loss (DU/DL). In addition, such failures often result in considerable customer dissatisfaction, damage to manufacturer brand, risk of escalation etc.

SUMMARY OF DISCLOSURE

In one example implementation, a computer-implemented method executed on a computing device may include, but is not limited to, generating a respective diagnostic history associated with each physical storage device of a plurality of physical storage devices. A subset of diagnostic history associated with a class of failing physical storage devices is identified from the diagnostic history associated with each physical storage device. The subset of diagnostic history associated with the class of failing physical storage devices is enhanced. A physical storage device failure event for a target physical storage device is forecast using a machine learning model and the enhanced subset of diagnostic history associated with the class of failing physical storage devices.

One or more of the following example features may be included. Enhancing the subset of diagnostic history associated with the class of failing physical storage devices may include generating a plurality of smart historical windows from the diagnostic history associated with each physical storage device. Enhancing the subset of diagnostic history associated with the class of failing physical storage devices may include performing oversampling of the subset of diagnostic history associated with the class of failing physical storage devices. Enhancing the subset of diagnostic history associated with the class of failing physical storage devices may include the machine learning model being trained using an ensemble methodology. Forecasting the physical storage device failure event for the target physical storage device may include forecasting a physical storage device replacement event. Forecasting the physical storage device failure event for the target physical storage device may include forecasting an actual physical storage device failure. A remedial action may be performed in response to forecasting the physical storage device failure event for the target physical storage device.

In another example implementation, a computer program product resides on a computer readable medium that has a plurality of instructions stored on it. When executed by a processor, the instructions cause the processor to perform operations that may include, but are not limited to, generating a respective diagnostic history associated with each physical storage device of a plurality of physical storage devices. A subset of diagnostic history associated with a class of failing physical storage devices is identified from the diagnostic history associated with each physical storage device. The subset of diagnostic history associated with the class of failing physical storage devices is enhanced. A physical storage device failure event for a target physical storage device is forecast using a machine learning model and the enhanced subset of diagnostic history associated with the class of failing physical storage devices.

One or more of the following example features may be included. Enhancing the subset of diagnostic history associated with the class of failing physical storage devices may include generating a plurality of smart historical windows from the diagnostic history associated with each physical storage device. Enhancing the subset of diagnostic history associated with the class of failing physical storage devices may include performing oversampling of the subset of diagnostic history associated with the class of failing physical storage devices. Enhancing the subset of diagnostic history associated with the class of failing physical storage devices may include the machine learning model being trained using an ensemble methodology. Forecasting the physical storage device failure event for the target physical storage device may include forecasting a physical storage device replacement event. Forecasting the physical storage device failure event for the target physical storage device may include forecasting an actual physical storage device failure. A remedial action may be performed in response to forecasting the physical storage device failure event for the target physical storage device.

In another example implementation, a computing system includes at least one processor and at least one memory architecture coupled with the at least one processor, wherein the at least one processor is configured to generate a respective diagnostic history associated with each physical storage device of a plurality of physical storage devices. A subset of diagnostic history associated with a class of failing physical storage devices is identified from the diagnostic history associated with each physical storage device. The subset of diagnostic history associated with the class of failing physical storage devices is enhanced. A physical storage device failure event for a target physical storage device is forecast using a machine learning model and the enhanced subset of diagnostic history associated with the class of failing physical storage devices.

One or more of the following example features may be included. Enhancing the subset of diagnostic history associated with the class of failing physical storage devices may include generating a plurality of smart historical windows from the diagnostic history associated with each physical storage device. Enhancing the subset of diagnostic history associated with the class of failing physical storage devices may include performing oversampling of the subset of diagnostic history associated with the class of failing physical storage devices. Enhancing the subset of diagnostic history associated with the class of failing physical storage devices may include the machine learning model being trained using an ensemble methodology. Forecasting the physical storage device failure event for the target physical storage device may include forecasting a physical storage device replacement event. Forecasting the physical storage device failure event for the target physical storage device may include forecasting an actual physical storage device failure. A remedial action may be performed in response to forecasting the physical storage device failure event for the target physical storage device.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
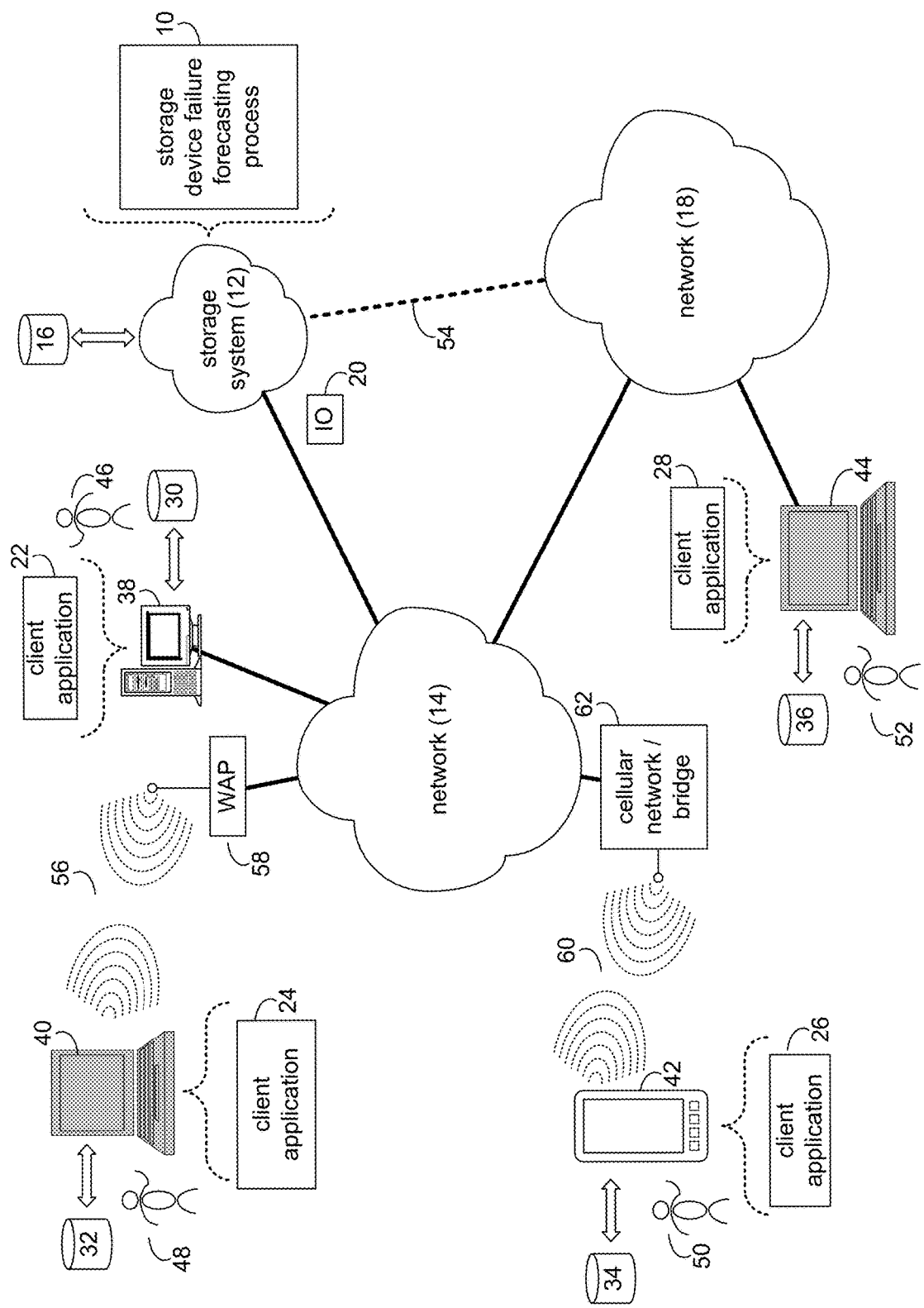
FIG. 1 is an example diagrammatic view of a storage system and a storage device failure forecasting process coupled to a distributed computing network according to one or more example implementations of the disclosure.

Referring to FIG. 1, there is shown storage device failure forecasting process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of storage device failure forecasting process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of storage device failure forecasting process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage device failure forecasting process, such as storage device failure forecasting process 10 of FIG. 1, may include but is not limited to, generating a respective diagnostic history associated with each physical storage device of a plurality of physical storage devices. A subset of diagnostic history associated with a class of failing physical storage devices is identified from the diagnostic history associated with each physical storage device. The subset of diagnostic history associated with the class of failing physical storage devices is enhanced. A physical storage device failure event for a target physical storage device is forecast using a machine learning model and the enhanced subset of diagnostic history associated with the class of failing physical storage devices.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
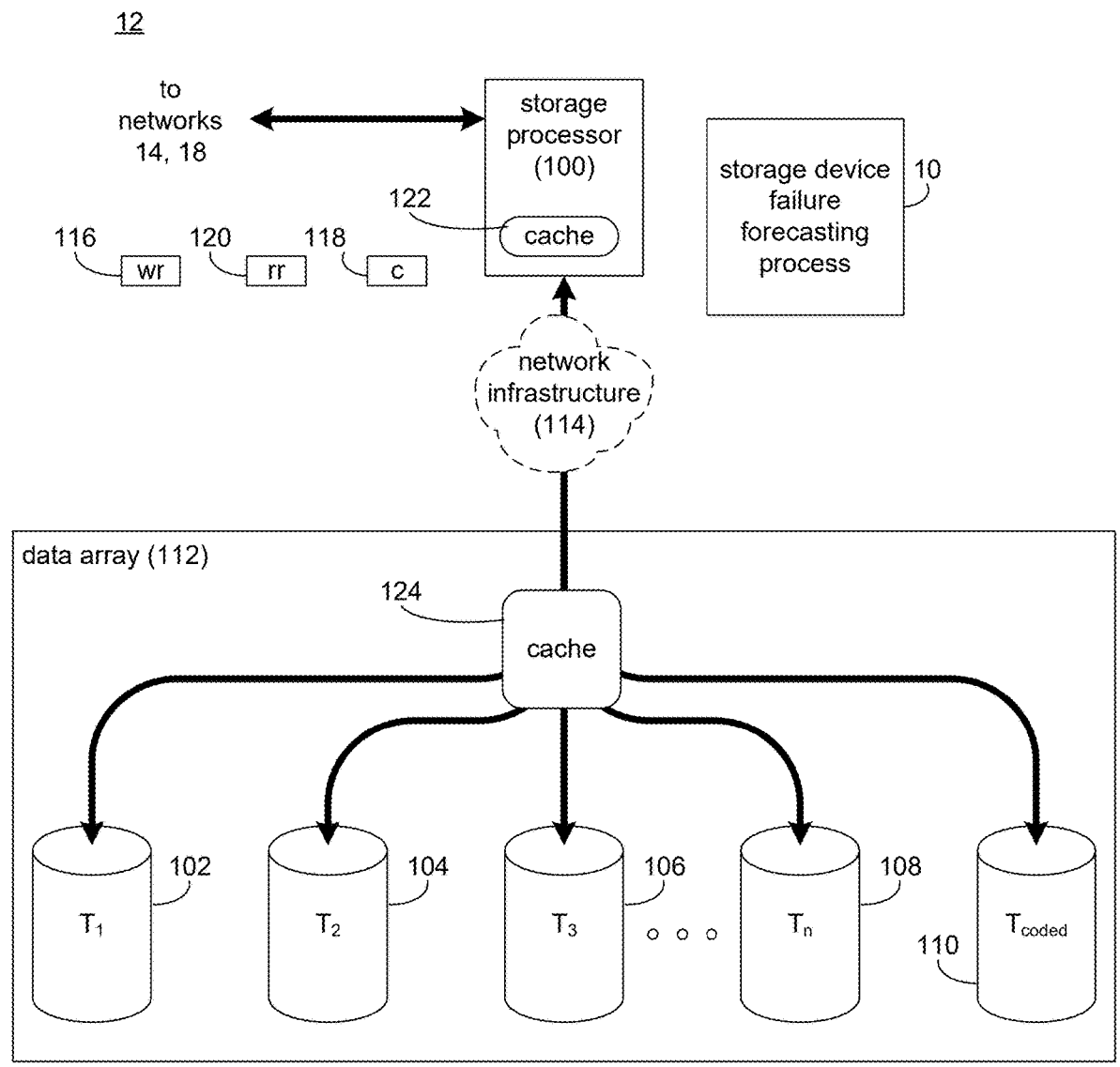
FIG. 2 is an example diagrammatic view of the storage system of FIG. 1 according to one or more example implementations of the disclosure.
Figure 3:
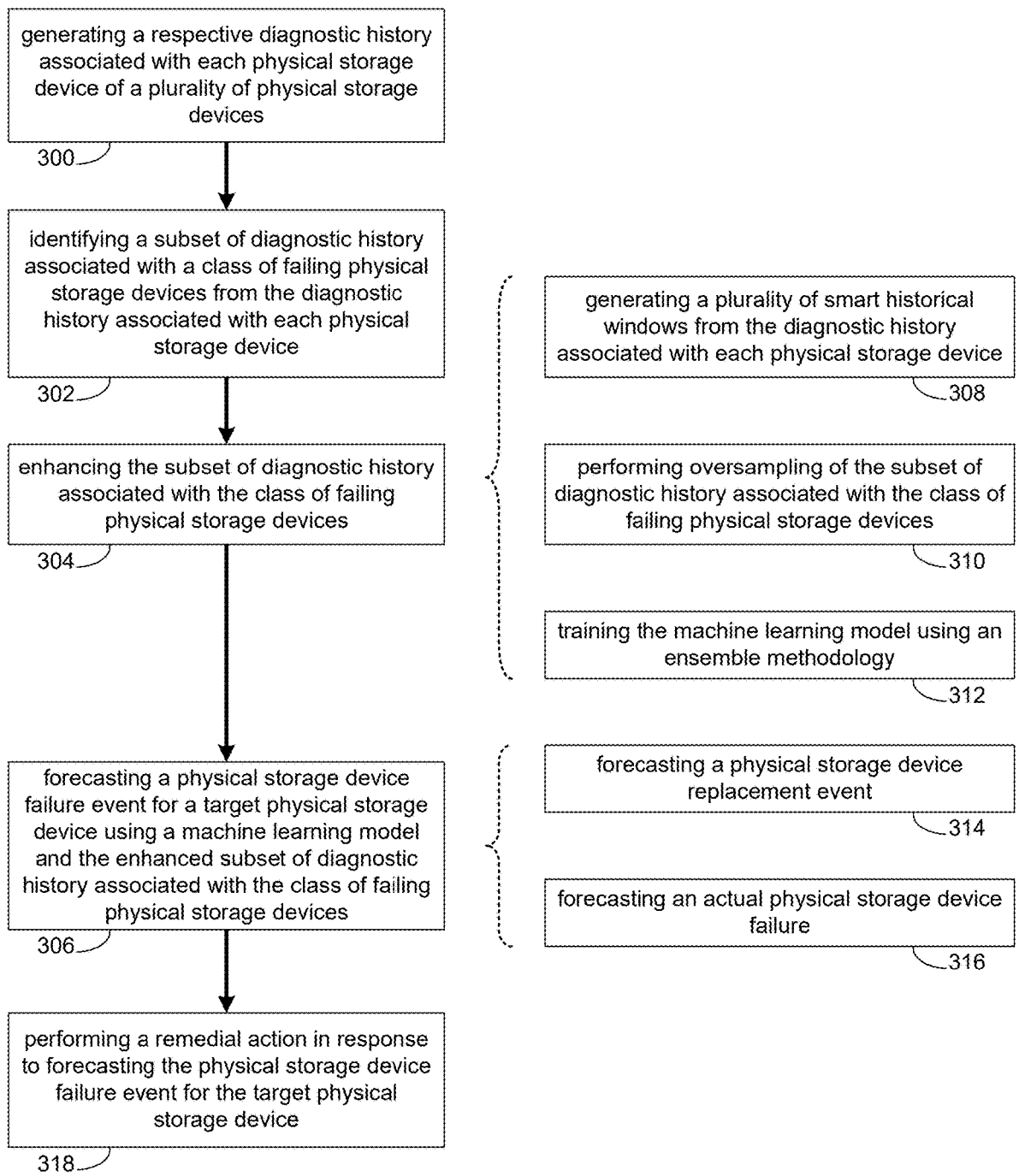
FIG. 3 is an example flowchart of storage device failure forecasting process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage device failure forecasting process 10. The instruction sets and subroutines of storage device failure forecasting process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of storage device failure forecasting process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g., one or more of storage targets 102, 104, 106, 108, and coded target 110.

As discussed above, the instruction sets and subroutines of storage device failure forecasting process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage device failure forecasting process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Storage Device Failure Forecasting Process:

Referring also to the examples of FIGS. 3-7 and in some implementations, storage device failure forecasting process 10 may generate 300 a respective diagnostic history associated with each physical storage device of a plurality of physical storage devices. A subset of diagnostic history associated with a class of failing physical storage devices is identified 302 from the diagnostic history associated with each physical storage device. The subset of diagnostic history associated with the class of failing physical storage devices is enhanced 304. A physical storage device failure event for a target physical storage device is forecast 306 using a machine learning model and the enhanced subset of diagnostic history associated with the class of failing physical storage devices.

As will be discussed in greater detail below, implementations of the present disclosure may allow for a complete machine learning-based methodology for forecasting, classifying and resolving storage device failures. As discussed above, storage devices, such as disks, are the primary components of storage subsystems. Recent studies indicate that disk failures are the biggest factor in storage failures, contributing 20-55% of storage subsystem failures. Vendor studies estimate that for most storage devices, the specified mean-time-to-failure (MTTF) is typically around one million hours, equivalent to about 1% annualized failure rate (AFR). The failure rates observed in user studies are even higher [0.9-1.9%].

The direct annual cost of disk replacements for storage and server systems is This includes the cost of onsite technician visits, express shipping of new parts, and collateral damage that may occur such as data unavailability or even data loss (DU/DL). In addition, such failures often result in considerable customer dissatisfaction, damage to manufacturer brand, risk of escalation etc.

As will be discussed in greater detail below, implementations of the present disclosure use telemetry data to construct a diagnostic history with field failure and/or replacement data to construct labels for each storage device. Using smart historical windows and other approaches to enlarge the (otherwise very small) minority class of failed storage device instances, and thus cope with the extreme class imbalance problem between non-failed storage devices and failed storage devices. The storage device failure forecasting process 10 forecasts storage device failures based on one or more of field replacement and actual component failure. A recommender system is used to suggest remediation actions. Storage device failure forecasting process 10 performs result aggregation allowing for planning and execution of proactive storage device replacements, potentially in batches, resulting in greater efficiency and significant cost savings.

In some implementations, storage device failure forecasting process 10 generates 300 a respective diagnostic history associated with each physical storage device of a plurality of physical storage devices. For example and as discussed above, physical storage devices (e.g., disks/storage targets) 102, 104, 106, 108, 110 may include one or more electro-mechanical hard disk drives and/or solid-state/flash devices within storage system 12. During operation of the physical storage devices, failure events often occur. Physical storage device failures are the most significant factor in storage system failures. To more effectively forecast and prevent physical storage device failures, storage device failure forecasting process 10 generates 300 a respective diagnostic history associated with each physical storage device. A diagnostic history is a representation of the operation of physical storage device over time that includes any physical storage device failures or replacements.

Figure 4:
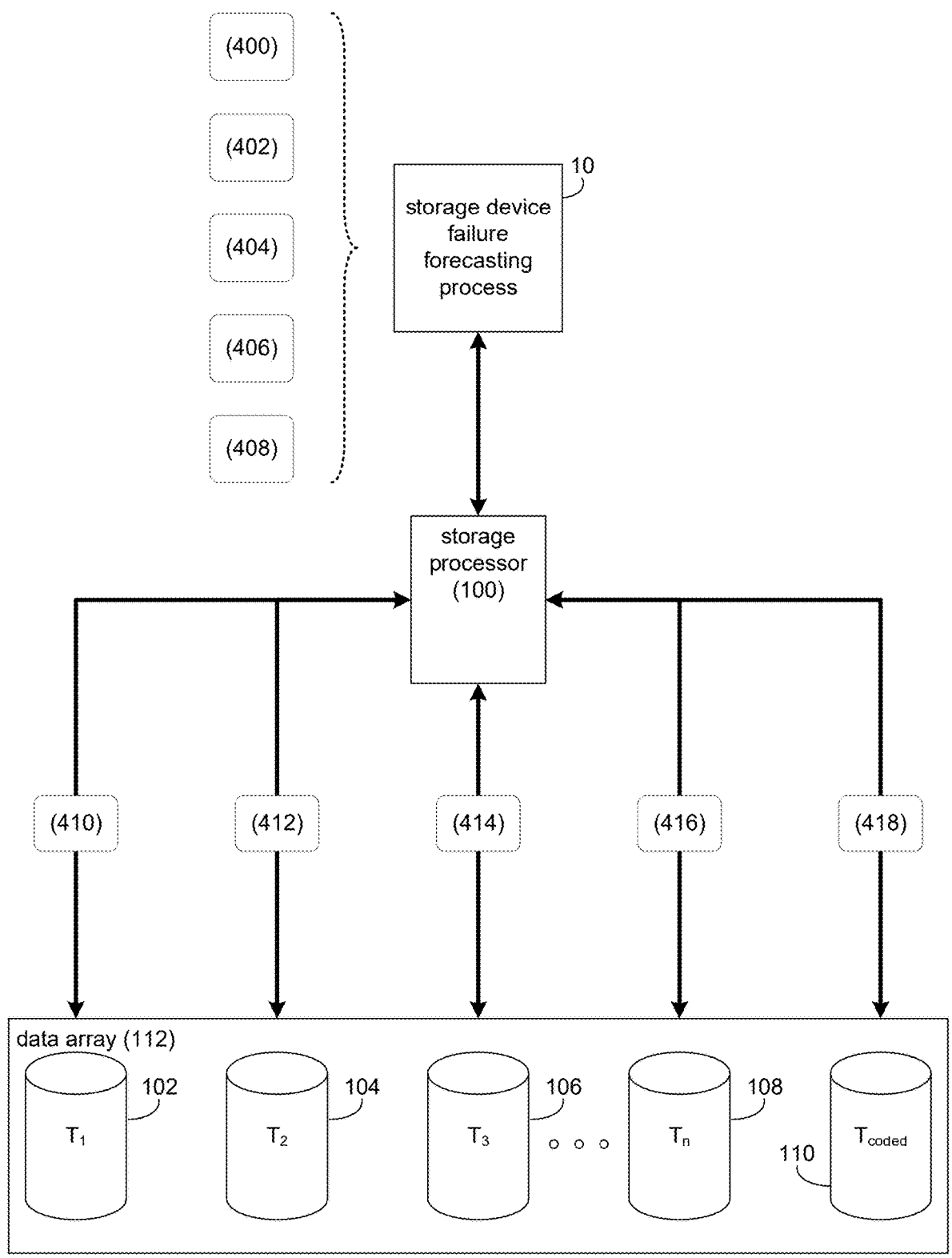
FIG. 4 is an example diagrammatic view of storage device failure forecasting process with the storage system of FIG. 2 according to one or more example implementations of the disclosure.

In some implementations, generating 300 a respective diagnostic history associated with each physical storage device includes leverages standardized telemetry data, specifically S.M.A.R.T. metrics derived from physical storage device components. Self-Monitoring, Analysis, and Reporting Technology (S.M.A.R.T., often written as SMART) is a monitoring system included in computer hard disk drives (HDDs) and solid-state drives (SSDs) that detects and reports various indicators of physical storage device reliability with the intent of anticipating imminent hardware failures. By analyzing diagnostic history, storage device failure forecasting process 10 creates actionable insights and the opportunity to perform predictive maintenance, reduce down time, and improve the operational efficiency and performance of the relevant platforms, as well as the overall customer satisfaction. Storage device failure forecasting process 10 utilizes both the standard SMART attributes as well as platform-specific telemetry data, which are collected on a daily basis from the relevant storage systems. This data encompasses a wide range of parameters, such as temperature, power-on-hours, error rates, and more, which are continuously monitored and recorded on the respective platforms. Referring also to FIG. 4, storage device failure forecasting process 10 generates diagnostic history associated with each physical storage device (e.g., diagnostic histories 400, 402, 404, 406, 408 for physical storage devices 102, 104, 106, 108, 110) by processing telemetry data from each physical storage device (e.g., telemetry data 410, 412, 414, 416, 418). In some implementations, telemetry data 410, 412, 414, 416, 418 is collected to a central cloud location and for parsing and analysis.

In some implementations, storage device failure forecasting process 10 identifies 302 a subset of diagnostic history associated with a class of failing physical storage devices from the diagnostic history associated with each physical storage device. For example, storage device failure forecasting process 10 processes telemetry data 410, 412, 414, 416, 418 using rigorous analysis, with advanced analytics and predictive algorithms techniques, including feature engineering, anomaly detection, and correlation analysis to identify patterns and anomalies that may indicate potential disk failures, performance degradation, or suboptimal operation, with a very high degree or precision and accuracy. In some implementations, storage device failure forecasting process 10 identifies 302, from the diagnostic history associated with each physical storage device, a subset of diagnostic history associated with a class of failing physical storage devices. For example, suppose that: diagnostic history 400 for physical storage device 102 indicates that physical storage device 102 experienced a failure event at a first point in time; diagnostic history 402 for physical storage device 104 indicates that physical storage device 104 experienced a failure event at a second point in time; and diagnostic history 406 for physical storage device 108 indicates that physical storage device 108 experienced a failure event at a third point in time. Accordingly, storage device failure forecasting process 10 identifies 302 a subset of diagnostic history (e.g., diagnostic history 400, 402, 406) associated with a class of failing physical storage devices (e.g., physical storage devices 102, 104, and 108).

In some implementations, storage device failure forecasting process 10 enhances 304 the subset of diagnostic history associated with the class of failing physical storage devices. Predicting failures using supervised machine learning (i.e., a classification model) in the presence of extreme class imbalance is challenging and may lead to incorrect results. Class imbalance refers to a situation where one class (in this case, failures) is significantly underrepresented compared to the other class (non-failures). As an example, in the case of one major platform that was evaluated, observations of failed disks made up only 0.005% of the overall number of observations, see Table 1 below.

TABLE 1

| Class Imbalance Challenge, Initial Situation | |
|---|---|
| Failed | # Observations |
| No | 42,502,993 |
| Yes | 1,901 |

The classification challenge with imbalanced datasets is that most machine learning techniques will "learn to ignore", and, as a result, perform poorly in detecting, the minority class samples, although typically it is the performance on the minority class (i.e., detection of failed disks in our case) that is most important. Accordingly, storage device failure forecasting process 10 enhances 304 the subset of diagnostic history associated with the class of failing physical storage devices by one or more of: generating 308 a plurality of smart historical windows from the diagnostic history associated with each physical storage device; performing 310 oversampling of the subset of diagnostic history associated with the class of failing physical storage devices; and/or training 312 the machine learning model using an ensemble methodology.

Figure 5:
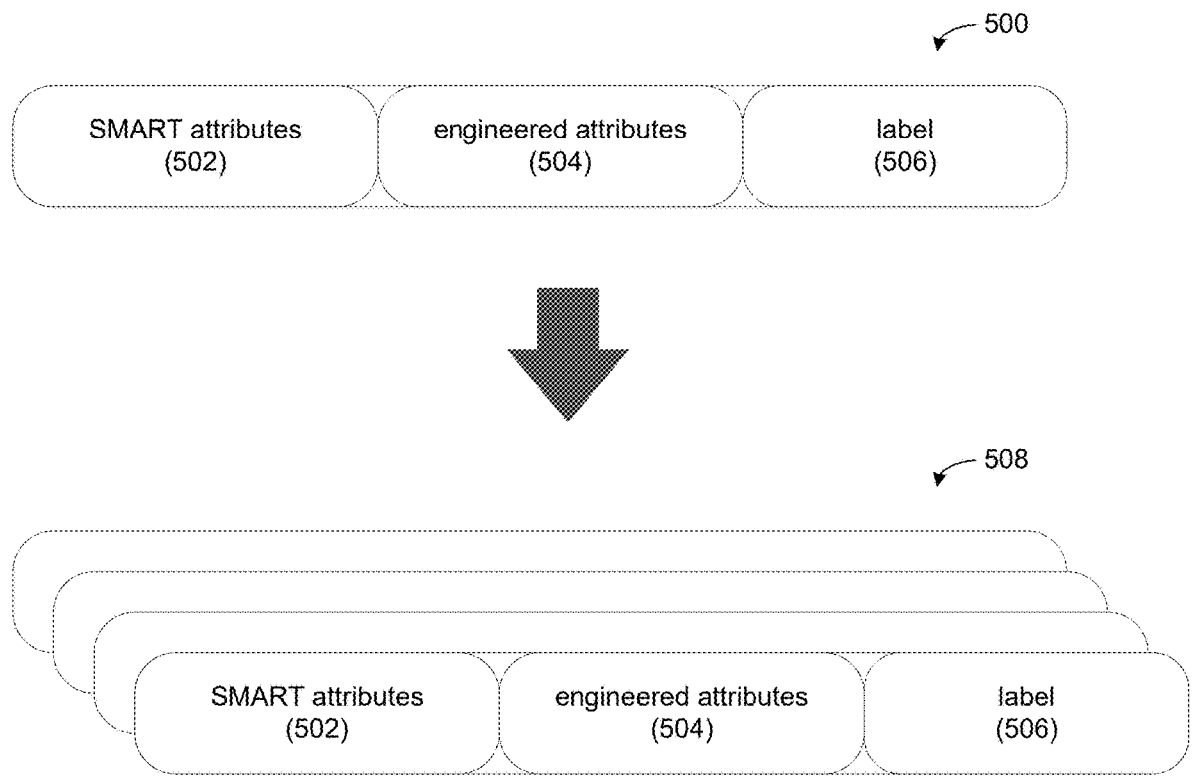
FIG. 5 is an example diagrammatic view of smart historical windows generated to enrich limited physical storage device failure data according to one or more example implementations of the disclosure.

In some implementations, enhancing 304 the subset of diagnostic history associated with the class of failing physical storage devices includes generating 308 a plurality of smart historical windows from the diagnostic history associated with each physical storage device. For example, to increase the number of samples labeled as failures (the minority class), storage device failure forecasting process 10 performs aggregation of the raw telemetry attributes over a "smart historical window" of the last 'n' days (e.g., n=60 in one example), as shown FIG. 5. Referring now to FIG. 5, a portion of diagnostic history or window of diagnostic history (e.g., window of diagnostic history 500). In this example, window of diagnostic history 500 includes "raw" SMART attributes 502, engineering attributes 504, and label 506. Engineering attributes 504 are features that are indicative of physical storage device failure (e.g., sudden spikes in base features) and label 506 is a label of the forecast for physical storage device for the relevant time period (i.e., non-failure status or failure status (e.g., field replacement or actual component failure)). Engineering attributes 504 are engineering using storage device failure forecasting process 10. In one example, engineering attributes 504 are generated using a temporal analysis model (i.e., a model that identifies patterns in the data over time). In another example, engineering attributes 504 are generated using a machine learning model.

The sliding windows (e.g., smart historical windows 508) capture and analyze data patterns occurring within this specific timeframe. In addition, storage device failure forecasting process 10 identifies sudden spikes in the base features during this period, which is highly useful in detecting potential upcoming failures. The combination of aggregating base features and capturing sudden spikes within each smart window provides a comprehensive and accurate representation of potential failure of physical storage device instances.

In some implementations, generating 308 the plurality of smart historical windows leverages temporal analysis techniques to extract meaningful insights from the diagnostic history data and enable the machine learning model to detect and predict failure patterns in disk systems with improved efficiency and accuracy. In one example using smart historical windows, storage device failure forecasting process 10 increased the size of the minority class by a factor of 83 relative to Table 1, as shown below in Table 2.

TABLE 2

Class Imbalance after Using Smart Historical Windows

| Failed | # Observations |
|---|---|
| No | 42,502,993 |
| Yes | 157,957 |

In some implementations, enhancing 304 the subset of diagnostic history associated with the class of failing physical storage devices includes performing 310 oversampling of the subset of diagnostic history associated with the class of failing physical storage devices. For example, one approach to addressing the extreme class imbalance involves duplicating samples from the minority class. However, these samples may not add new information to a machine learning model. In some implementations, storage device failure forecasting process 10 uses a data augmentation approach to synthesize new samples from existing samples. In one example, storage device failure forecasting process 10 uses the Synthetic Minority Oversampling Technique (SMOTE) method, though other methods can be used as well.

By using the oversampling technique (i.e., creating synthetic samples of the minority class), storage device failure forecasting process 10 balances between the two classes, as shown below in Table 3. In some implementations, storage device failure forecasting process 10 does not reach a 50%-50% balance, and other sizes for the minority class may be used within the scope of the present disclosure (e.g., 5%, 10%, 20%, 50%).

TABLE 3

Class Imbalance after Using Resampling Techniques

| Failed | # Observations |
|---|---|
| No | 42,502,993 |
| Yes | 42,502,993 |

In some implementations, enhancing 304 the subset of diagnostic history associated with the class of failing physical storage devices includes the machine learning model being trained 312 using an ensemble methodology. For example, when training a machine learning model on imbalanced datasets, the machine learning model tends to become biased towards the majority class. During inference, this can result in poor performance on detection of minority class samples, which is often the class of interest, as is in our case. An ensemble methodology includes machine learning algorithms that combine the predictions of multiple base models to improve their overall performance and accuracy. For example, with the ensemble methodology, multiple base (i.e., "weak") models are trained on the same dataset, and their predictions are aggregated to produce a final prediction. One ensemble approach which is particularly useful when coping with class imbalance is boosting, where a sequential aggregate of base classifier is constructed using weighted versions of the training data, focusing on misclassified samples at each stage, and generating new classifiers based on the sample weights that are changed according to the performance of the classifier.

XGBoost is a well-known boosting algorithm that can be used to iteratively improve the model performance for the minority class samples by assigning a higher weight to misclassified data points in the minority class. XGBoost also allows for parameter tuning, such as adjusting the learning rate, number of trees, and depth of each tree. By tuning these parameters after the machine learning model is deployed, storage device failure forecasting process 10 starts collecting feedback on the classification results, storage device failure forecasting process 10 further improves the machine learning model's ability to capture the nuances of the minority class and achieve even better performance.

Figure 6:
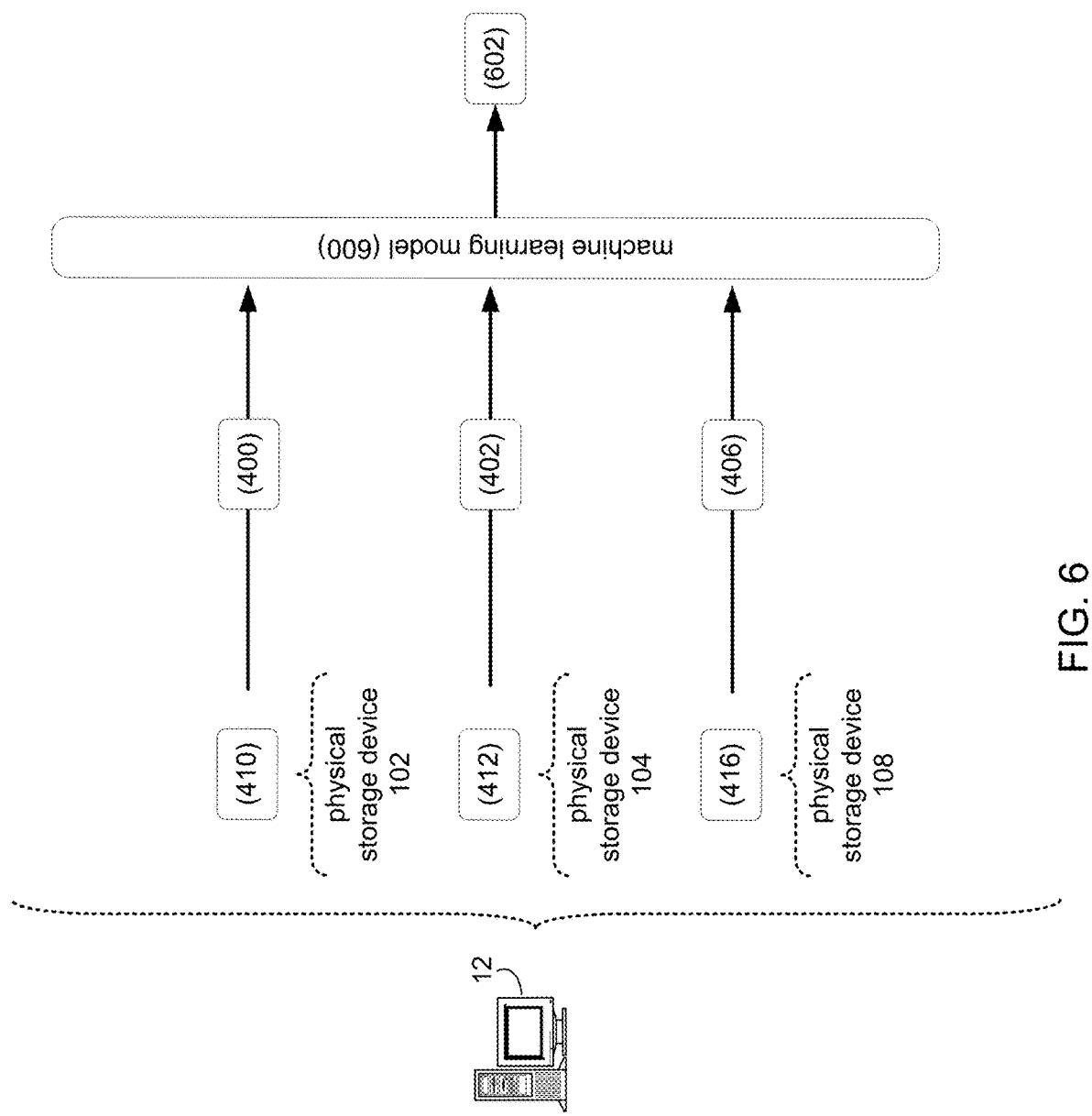
FIG. 6 is an example diagrammatic view of the storage device failure forecasting process according to one or more example implementations of the disclosure.

In some implementations, storage device failure forecasting process 10 forecasts 306 a physical storage device failure event for a target physical storage device using a machine learning model and the enhanced subset of diagnostic history associated with the class of failing physical storage devices. Referring also to FIG. 6 and as discussed above, suppose telemetry data 410 for physical storage device 102 is used to generate diagnostic history 400 which indicates that physical storage device 102 experiences a physical storage device failure event; telemetry data 412 for physical storage device 104 is used to generate diagnostic history 402 which indicates that physical storage device 104 experiences a physical storage device failure event; and telemetry data 416 for physical storage device 108 is used to generate diagnostic history 406 which indicates that physical storage device 108 experiences a physical storage device failure event. In this example, storage device failure forecasting process 10 processes the subset of diagnostic history associated with the class of failing physical storage devices (e.g., diagnostic history 400, 402, 406) using a machine learning model (e.g., machine learning model 600). As will be discussed in greater detail below, machine learning model 600 forecasts 306 whether and/or when a physical storage device failure event for a target physical storage device is likely to occur (e.g., physical storage device failure event forecast 602).

For example, a machine learning model generally includes an algorithm or combination of algorithms that has been trained to recognize certain types of patterns. Machine learning approaches may be generally divided into three categories, depending on the nature of the signal available: supervised learning, unsupervised learning, and reinforcement learning. Supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning may generally include a computing device interacting in a dynamic environment in which it must perform a certain goal (such as driving a vehicle or playing a game against an opponent). As it navigates its problem space, the machine learning model is provided feedback that is analogous to rewards, which it tries to maximize. While three examples of machine learning approaches have been provided, it will be appreciated that other machine learning approaches are possible within the scope of the present disclosure.

Forecasting 306 a physical storage device failure event for a target physical storage device generally includes the generating of a prediction of a time period when there is at least a threshold probability that a physical storage device is likely to experience a physical storage device failure event using the machine learning model. The time period and/or threshold probability may be user-defined and/or default values.

In some implementations, forecasting 306 the physical storage device failure event for the target physical storage device includes forecasting 314 a physical storage device replacement event. For example, a physical storage device failure may not only be indicative of actual physical storage device failure but may also be indicative of when a physical storage device will "fail" because it is replaced. For example, suppose physical storage device 104 is scheduled to be replaced at a certain point in time. In this example, storage device failure forecasting process 10 may forecast 314 the physical storage device failure event for physical storage device 104 as the point in time when physical storage device 104 is scheduled to be replaced. In another example, suppose physical storage device 104 is scheduled to be replaced when physical storage device 104 has performed a certain amount of data storage (e.g., a threshold amount of write operations processed, a threshold amount of data processed, etc.). In this example, storage device failure forecasting process 10 may forecast 306 a physical storage device replacement event as the point in time when physical storage device 104 is scheduled to be replaced after performing the threshold amount of data storage.

In some implementations, forecasting 306 the physical storage device failure event for the target physical storage device includes forecasting 316 an actual physical storage device failure. For example, forecasting 316 the physical storage device failure event generally includes predicting when (in a predefined period of time) the physical storage device will experience an actual failure. For example, storage device failure forecasting process 10 may process telemetry data 410, 412, 416 using machine learning model 600. Machine learning model 600 may be trained to process telemetry data concerning the physical storage device with the enriched diagnostic history data to forecast a point in time when a respective physical storage device will likely experience an actual failure. In some implementations, a physical storage device failure event forecast (e.g., physical storage device failure event forecast 602) may be a point in time (e.g., an hour, a day, a week, a month, and/or a year) when a respective physical storage device is predicted to fail.

In some implementations, storage device failure forecasting process 10 performs 318 a remedial action in response to forecasting the physical storage device failure event for the target physical storage device. For example, performing 318 a remedial action in response to forecasting the physical storage device failure event may generally include automatically initiating a remedial action or alerting a user (e.g., a storage system user or storage system administrator) to perform a remedial action. A remedial action may generally include an action that replaces the physical storage device for which the physical storage device failure is forecasted or that resolves the forecast physical storage device failure (e.g., by scheduling service, performing troubleshooting, etc.).

Figure 7:
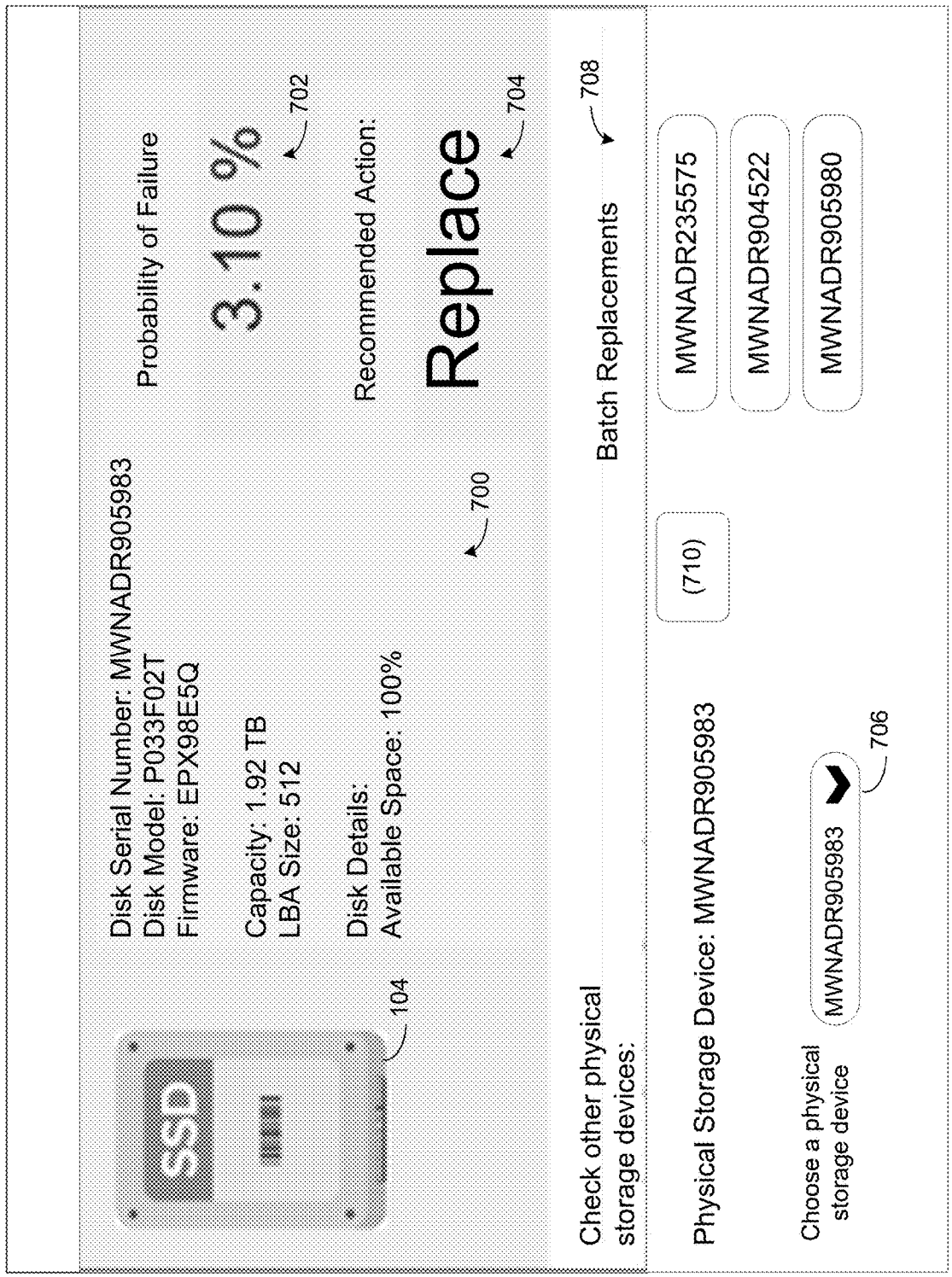
FIG. 7 is an example remedial action in the form of a user interface alerting a user of a forecasted SFP transceiver failure according to one or more example implementations of the disclosure.

In some implementations, performing 318 the remedial action includes generating a recommendation to replace the physical storage device in advance of the forecast physical storage device failure. For example and referring also to FIG. 7, suppose that storage device failure forecasting process 10 forecasts that physical storage device 104 is forecasted to fail at a certain point in time. In this example, storage device failure forecasting process 10 may generate a recommendation to replace physical storage device 104 as shown in FIG. 7 with information concerning physical storage device 104 (e.g., physical storage device information 700); a representation of the predicted conditions for physical storage device failure (e.g., countdown 702); and a recommended action (e.g., recommended action 704 to "Replace" physical storage device 104). In some implementations, recommended action 704 may be an automatically initiated action (e.g., performed automated troubleshooting or rebooting of the physical storage device 104) or may be a recommended action for a user to perform (e.g., an instruction on when and how to replace the physical storage device). For example, storage device failure forecasting process 10 may access a database of rules and conditions for providing specific recommendations from a plurality of possible recommendations. Storage device failure forecasting process 10 may compare the physical storage device forecast information against various metrics to determine what type of action is recommended to perform on the physical storage device that is forecasted to fail. In some examples, storage device failure forecasting process 10 may generate a recommendation in the form of an alert broadcast to one or more computing devices and/or a pop-up message or user interface as shown in FIG. 7. In this manner, storage device failure forecasting process 10 may generate a recommendation that alerts a user to perform a particular remedial action or of an action that is automatically being implemented.

In some implementations, performing 318 the remedial action includes generating a recommendation to replace a plurality of components from a storage system including the physical storage device with the forecast physical storage device failure event. Referring again to FIG. 7, storage device failure forecasting process 10 may generate a recommendation in the form of an interactive user interface with various features. For example, the recommendation may include an option (e.g., option 706) to select or switch between physical storage devices of a storage system. In another example, storage device failure forecasting process 10 may generate a recommendation to replace a plurality of components from the storage system. For example, the user interface of FIG. 7 may include options for batch replacements (e.g., batch replacement information 708). In this example, a user may select an option (e.g., option 710) to identify a plurality of components (e.g., physical storage device 104 and other components that may influence physical storage device performance) to replace in response to forecasting the physical storage device failure. As shown in the example of FIG. 7, storage device failure forecasting process 10 generates a recommendation to replace a plurality of physical storage devices that are forecasted to fail within a threshold amount of time (e.g., a user-defined threshold, a default amount of time, etc.) of physical storage device 104. In this manner, storage device failure forecasting process 10 generates recommendations to perform batches of remedial actions to increase the efficiency of any singular remedial action.

GENERAL

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    generating a respective diagnostic history associated with each physical storage device of a plurality of physical storage devices;
    identifying a subset of diagnostic history associated with a class of failing physical storage devices from the diagnostic history associated with each physical storage device;
    enhancing the subset of diagnostic history associated with the class of failing physical storage devices, wherein enhancing the subset of diagnostic history associated with the class of failing physical storage devices includes performing oversampling of the subset of diagnostic history associated with the class of failing physical storage devices; and
    forecasting a physical storage device failure event for a target physical storage device using a machine learning model and the enhanced subset of diagnostic history associated with the class of failing physical storage devices.

2. The computer-implemented method of claim 1, wherein enhancing the subset of diagnostic history associated with the class of failing physical storage devices includes generating a plurality of smart historical windows from the diagnostic history associated with each physical storage device.

3. The computer-implemented method of claim 1, wherein enhancing the subset of diagnostic history associated with the class of failing physical storage devices includes the machine learning model being trained using an ensemble methodology.

4. The computer-implemented method of claim 1, wherein forecasting the physical storage device failure event for the target physical storage device includes forecasting a physical storage device replacement event.

5. The computer-implemented method of claim 1, wherein forecasting the physical storage device failure event for the target physical storage device includes forecasting an actual physical storage device failure.

6. The computer-implemented method of claim 1, further comprising:
    performing a remedial action in response to forecasting the physical storage device failure event for the target physical storage device.

7. A computer program product residing on a non-transitory computer readable medium having a plurality of instructions stored thereon which, when executed by a processor, cause the processor to perform operations comprising:
    generating a respective diagnostic history associated with each physical storage device of a plurality of physical storage devices;
    identifying a subset of diagnostic history associated with a class of failing physical storage devices from the diagnostic history associated with each physical storage device;
    enhancing the subset of diagnostic history associated with the class of failing physical storage devices, wherein enhancing the subset of diagnostic history associated with the class of failing physical storage devices includes performing oversampling of the subset of diagnostic history associated with the class of failing physical storage devices; and
    forecasting a physical storage device failure event for a target physical storage device using a machine learning model and the enhanced subset of diagnostic history associated with the class of failing physical storage devices.

8. The computer program product of claim 7, wherein enhancing the subset of diagnostic history associated with the class of failing physical storage devices includes generating a plurality of smart historical windows from the diagnostic history associated with each physical storage device.

9. The computer program product of claim 7, wherein enhancing the subset of diagnostic history associated with the class of failing physical storage devices includes the machine learning model being trained using an ensemble methodology.

10. The computer program product of claim 7, wherein forecasting the physical storage device failure event for the target physical storage device includes forecasting a physical storage device replacement event.

11. The computer program product of claim 7, wherein forecasting the physical storage device failure event for the target physical storage device includes forecasting an actual physical storage device failure.

12. The computer program product of claim 7, wherein the operations further comprise:
    performing a remedial action in response to forecasting the physical storage device failure event for the target physical storage device.

13. A computing system comprising:
    a memory; and
    a processor configured to generate a respective diagnostic history associated with each physical storage device of a plurality of physical storage devices, to identify a subset of diagnostic history associated with a class of failing physical storage devices from the diagnostic history associated with each physical storage device, to enhance the subset of diagnostic history associated with the class of failing physical storage devices, wherein enhancing the subset of diagnostic history associated with the class of failing physical storage devices includes performing oversampling of the subset of diagnostic history associated with the class of failing physical storage devices, and to forecast a physical storage device failure event for a target physical storage device using a machine learning model and the enhanced subset of diagnostic history associated with the class of failing physical storage devices.

14. The computing system of claim 13, wherein enhancing the subset of diagnostic history associated with the class of failing physical storage devices includes generating a plurality of smart historical windows from the diagnostic history associated with each physical storage device.

15. The computing system of claim 13, wherein enhancing the subset of diagnostic history associated with the class of failing physical storage devices includes the machine learning model being trained using an ensemble methodology.

16. The computing system of claim 13, wherein forecasting the physical storage device failure event for the target physical storage device includes forecasting a physical storage device replacement event.

17. The computing system of claim 13, wherein forecasting the physical storage device failure event for the target physical storage device includes forecasting an actual physical storage device failure.

\* \* \* \* \*